United States Patent Office 2,814,629
Patented Nov. 26, 1957

2,814,629

12-OXYGENATED-4,9(11)-PREGNADIENE-3,20-DIONE

Josef Fried and Josef E. Herz, New Brunswick, N. J., assignors to Olin Mathieson Chemical Corporation, New York, N. Y., a corporation of Virginia No Drawing. Application July 30, 1956,
Serial No. 600,674

5 Claims. (Cl. 260—397.3)

This application is a continuation-in-part of our present application, Serial No. 545,795, filed November 8, 1955.

This invention relates to the synthesis of valuable steroids and has for its object the provision of steroids of the general formula

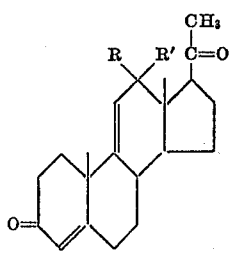

wherein R is hydrogen, R' is α-hydroxy or α-acyloxy (particularly the acyloxy radical of a hydrocarbon carboxylic acid of less than ten carbon atoms, as exemplified by the lower fatty acids), and together R and R' is keto.

To prepare the steroids of this invention, 11-dehydroprogesterone is treated with a hydroxybrominating agent in the presence of water to yield $\Delta^{4,9(11)}$-pregnadiene-12α-ol-3,20-dione, which can then, if desired, be acylated in the usual manner to yield a 12α-acyloxy derivative or oxidized to $\Delta^{4,9(11)}$-pregnadiene-3,12,20-trione. Among the hydroxybrominating agents utilizable in the process of this invention may be mentioned an N-bromamide of a lower alkanoic acid (e. g., N-bromacetamide), an N-bromimide of a lower alkanedioic acid (e. g., N-bromosuccinimide), and dibromodimethylhydantoin. The reaction is optimally carried out in the presence of a strong acid (e. g., perchloric acid or sulfuric acid). The reaction can be conducted at any normal temperature (e. g., ambient temperature) under normal pressure (e. g., ambient pressure).

The reaction results, inter alia, in the production of $\Delta^{4,9(11)}$-pregnadiene-12α-ol-3,20-dione, which can then be acylated in the usual manner by treatment with an acyl halide or acid anhydride, such as acetic anhydride, propionic anhydride, or benzoyl chloride. This reaction is preferably carried out in an organic base such as pyridine.

The $\Delta^{4,9(11)}$-pregnadiene-12α-ol-3,20-dione can also be oxidized, as by treatment with a hexavalent chromium compound (e. g., chromic acid), to $\Delta^{4,9(11)}$-pregnadiene-3,12,20-trione.

The steroids of this invention are physiologically active compounds which possess progestational activity. Thus, these new steroids can be administered instead of, and in the same manner as, progesterone in the treatment of habitual abortions. The dosage for such administration is, of course, dependent on the relative activity of the steroid. Thus, where the steroid in question has approximately the same activity as progesterone, the dosage of the former should be approximately equal to the employed dosage of the latter.

The following examples are illustrative of the invention (all temperatures being in centigrade):

EXAMPLE 1

$\Delta^{4,9(11)}$-pregnadiene-12α-ol-3,20-dione

To a solution of 900 mg. of 11-dehydroprogesterone in 90 ml. of dioxane is added 54 ml. of 0.16 N perchloric acid and 540 mg. of N-bromacetamide. After 20 minutes at room temperature, dilute sodium sulfite solution is added to destroy excess N-bromacetamide and 100 ml. of chloroform is added. After separation of the layers, the chloroform-dioxane phase is washed with water, dilute sodium bicarbonate and again with water and the solvents removed in vacuo at 20°. The residue crystallizes readily from acetone-hexane, yielding crude 12α-bromo-11β-hydroxyprogesterone. Concentration of the acetone-hexane mother liquor in vacuo yields $\Delta^{4,9(11)}$-pregnadiene-12α-ol-3,20-dione, which after recrystallization from acetone, has the following properties: M. P. about 181–182°; $[\alpha]_D^{23}+181°$ (c, 0.95 in chloroform);

$$\lambda_{max.}^{alc.}\ 239\ m\mu$$

($\epsilon$=16,300);

$$\lambda_{max.}^{Nujol}$$

2.92, 2.98, 5.92, 6.02 and 6.21 μ.

Analysis.—Calcd. for $H_{21}H_{28}O_3$ (328.44): C, 76.79; H, 8.59. Found: C, 76.46; H, 8.49.

EXAMPLE 2

$\Delta^{4,9(11)}$-pregnadiene-12α-ol-3,20-dione 12α-acetate

A solution of 15 mg. of $\Delta^{4,9(11)}$-pregnadiene-12α-ol-3,20-dione in 0.5 ml. of pyridine and 0.5 ml. of acetic anhydride is allowed to stand at room temperature for 18 hours. Evaporation of the reagents in vacuo leaves $\Delta^{4,9(11)}$-pregnadiene-12α-ol-3,20-dione 12α-acetate, which could not be induced to crystallize. It has the following properties: $[\alpha]_D^{23}+322°$ (c, 1.7 in chloroform);

$$\lambda_{max.}^{chloroform}$$

No OH bands, 5.80, 5.88, 6.01 and 6.19 μ.

Similarly, by substituting propionic anhydride or benzoyl chloride for the acetic anhydride in the procedure of Example 2, the 12α-propionate and 12α-benzoate, respectively, are formed.

EXAMPLE 3

$\Delta^{4,9(11)}$-pregnadiene-3,12,20-trione

A solution of 15 mg. of $\Delta^{4,9(11)}$-pregnadiene-12α-ol-3,20-dione in 2 ml. of acetone is oxidized with 0.035 ml. of a solution of chromium trioxide (200 mg.)-sulfuric acid (320 mg.) in 1 ml. water. The reaction is stopped by the addition of a few drops of alcohol and the mixture diluted with water and chloroform. The chloroform layer is washed with water, dilute bicarbonate and water and the solvent removed in vacuo. The residue after crystallization from acetone has the following properties: M. P. about 197–198°; $[\alpha]_D^{23}+168°$ (c, 0.68 in chloroform);

$$\lambda_{max.}^{alc.}\ 239\ m\mu$$

($\epsilon$=25,700).

Analysis.—Calcd. for $C_{21}H_{26}O_3$ (326.42): C, 77.27; H, 7.31. Found: C, 77.22; H, 7.92.

The invention may be otherwise variously embodied within the scope of the appended claims.

We claim:
1. A steroid of the general formula

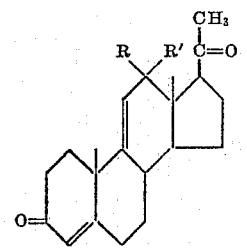

wherein R is hydrogen, R' is selected from the group consisting of α-hydroxy and the α-acyloxy radical of a hydrocarbon carboxylic acid of less than ten carbon atoms, and together R and R' is oxygen.

2. $\Delta^{4,9(11)}$-pregnadiene-12α-ol-3,20-dione.
3. An ester of $\Delta^{4,9(11)}$-pregnadiene-12α-ol-3,20-dione and a hydrocarbon carboxylic acid of less than ten carbon atoms.
4. $\Delta^{4,9(11)}$-pregnadiene-12α-ol-3,20-dione 12α-acetate.
5. $\Delta^{4,9(11)}$-pregnadiene-3,12,20-trione.

References Cited in the file of this patent
UNITED STATES PATENTS

| | | |
|---|---|---|
| 2,409,798 | Reichstein | Oct. 22, 1946 |
| 2,628,240 | Levin | Feb. 10, 1953 |
| 2,655,516 | Levin | Oct. 13, 1953 |
| 2,697,704 | Levin | Dec. 21, 1954 |
| 2,697,706 | Levin | Dec. 21, 1954 |